US008073829B2

(12) United States Patent
Lopez et al.

(10) Patent No.: US 8,073,829 B2
(45) Date of Patent: Dec. 6, 2011

(54) HTTP CACHE WITH URL REWRITING

(75) Inventors: Daniel Vasquez Lopez, Duvall, WA (US); Ruslan A. Yakushev, Sammamish, WA (US); Anil K. Ruia, Issaquah, WA (US); Wade A. Hilmo, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 12/276,492

(22) Filed: Nov. 24, 2008

(65) Prior Publication Data

US 2010/0131487 A1 May 27, 2010

(51) Int. Cl.
*G06F 7/00* (2006.01)
*G06F 17/30* (2006.01)
*G06F 15/173* (2006.01)

(52) U.S. Cl. ......................... 707/705; 707/722; 709/242
(58) Field of Classification Search .................. None
See application file for complete search history.

(56) References Cited

U.S. PATENT DOCUMENTS

| | | | |
|---|---|---|---|
| 7,127,713 B2 | 10/2006 | Davis et al. | |
| 7,213,071 B2 | 5/2007 | DeLima et | |
| 7,240,100 B1 | 7/2007 | Wein et al. | |
| 7,536,391 B2* | 5/2009 | Christian et al. | 707/999.01 |
| 2002/0065850 A1* | 5/2002 | Baudu et al. | 707/513 |
| 2002/0078233 A1* | 6/2002 | Biliris et al. | 709/238 |
| 2002/0099785 A1* | 7/2002 | Teeple | 709/214 |
| 2002/0116531 A1* | 8/2002 | Chu | 709/246 |
| 2002/0156841 A1* | 10/2002 | Landfeldt et al. | 709/203 |
| 2003/0188021 A1 | 10/2003 | Challenger et al. | |
| 2004/0267961 A1* | 12/2004 | Dietz et al. | 709/245 |
| 2006/0218304 A1 | 9/2006 | Mukherjee et al. | |
| 2008/0229025 A1 | 9/2008 | Plamondon | |

OTHER PUBLICATIONS

"Microsoft URL Rewrite Module for IIS 7.0 Go Live (x86)", retrieved at <<http://www.iis.net/downloads/default.aspx? tabid=34 &i=1691&g=6>>, Oct. 8, 2008, pp. 1-3.
"Helicon Tech", "ISAPI_Rewrite 2 Documentation", retrieved at <<http://www.isapirewrite.com/docs/>>, Oct. 7, 2008, pp. 1-16.
"Web Server Performance Optimization", retrieved at <<http://www.seoconsultants.com/articles/1000/performance-optimization.asp>>, Oct. 7, 2008, pp. 1-3.
"Drupal HTTP Cache", retrieved at <<http://testbit.eu/wiki/Drupal-HTTP-Cache>>, Oct. 7, 2008, pp. 1-2.
"Limitations: Kernel Cache & mod_rewrite Directives?", retrieved at <<http://forums.iis.net/p/1151065/1877731.aspx>>, Oct. 7, 2008, pp. 1-4.

* cited by examiner

*Primary Examiner* — Tim T Vo
*Assistant Examiner* — Garrett Smith (57) ABSTRACT

URL rewriting is a common technique for allowing users to interact with internet resources using easy to remember and search engine friendly URLs. When URL rewriting involves conditions derived for sources other than the URL, inconsistencies in HTTP kernel cache and HTTP user output cache may arise. Methods and a system for rewriting a URL while preserving cache integrity are disclosed herein. Conditions used by a rule set to rewrite a URL may be determined as cache friendly conditions or cache unfriendly conditions. If cache unfriendly conditions exist, the HTTP kernel cache is disabled and the HTTP user output cache is varied based upon a key. If no cache unfriendly conditions exist, then the HTTP kernel cache is not disabled and the HTTP user output cache is not varied. A rule set is applied to the URL and a URL rewrite is performed to create a rewritten URL.

20 Claims, 8 Drawing Sheets

HTTP CACHE WITH URL REWRITING

BACKGROUND

URLs are commonly used as text-based addresses to identify internet resources (e.g., web pages). It may be advantageous to identify an internet resource that may be easily remembered by a user and easily found through search engines. Because a URL may comprise additional information used by the internet resource, the URL may become complex and difficult to discover through searches. URL rewriting is a common technique to allow users to interact with an internet resource using a simple URL. The user may enter a simple URL that is then rewritten to a URL comprising more complex and useful information for the internet resource (e.g., information concerning the web browser requesting the URL). Another technique used to enhance a user's experience with internet resources is caching techniques allowing URL and/or internet data to be stored for quick access.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for rewriting an input URL while preserving the integrity of HTTP kernel cache and HTTP user output cache is provided herein. An input URL comprising at least one condition is received. The input URL may be comprised within an HTTP request. The condition may relate to an HTTP header, HTTP server variables, and/or other information that may be used in applying a rule set to the input URL. A determination is made as to whether at least one condition is cache unfriendly. The condition may be cache unfriendly if the condition derives from a source other than the input URL (e.g., an HTTP server variable deriving from web browser information). The condition may be cache friendly if the condition derives from the input URL and/or is a constant value. A server (e.g., a web hosting process) may resolve HTTP server variables corresponding to an HTTP request, for example.

If at least one cache unfriendly condition exists, then a key is created comprising a concatenation of the input URL and the cache unfriendly conditions. A rule set is executed upon the input URL to create an output URL. The execution of the rule set may be bypassed if a cached rewritten URL, corresponding to the input URL, exists within an internal cache. If at least one cache unfriendly condition exists, then a HTTP kernel cache is disabled and an HTTP user output cache is varied based upon the key. A URL rewrite is performed on the output URL to create a rewritten URL. If the rewritten URL is frequently accessed, then the rewritten URL may be stored within the internal cache as a cached rewritten URL. This technique allows HTTP user output cache and/or HTTP kernel cache to be utilized in certain situations. For example, if no cache unfriendly conditions exist, then HTTP kernel cache may still be used to provide improved performance. HTTP user output cache is not disabled, but is altered based upon the cache unfriendly conditions, thus mitigating cache inconsistencies while maintaining improved performance from utilizing the cache.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

URL rewriting provides users with easy to remember and search engine friendly URLs corresponding to internet resources. URL rewriting allows modification to the appearance of a web site's URL based upon a rule set and conditions which may be based on contextual information. URL rewriting may be accomplished by applying the rule set to a URL to produce a rewritten URL. For example, a user may input a URL "www.carmaker.com/carmodel" to access an internet resource. The input URL may be easy for the user to remember and understand. Once the input URL is received, a URL rewriting module may apply a rule set to the input URL to create a rewritten URL "www.carmaker.com/2348/autheni-cated/region3/en-us/carmodel?a=3". The input URL is more concise and user friendly than the rewritten URL, but the input URL is rewritten because the internet resource may take advantage of additional information within the rewritten URL that is not provided in the input URL.

Another technique used in accessing internet resources is caching. Two common types of caching are HTTP kernel cache and HTTP user output cache (e.g., caching technique used in IIS). HTTP kernel cache may increase performance of a web page (e.g., load time) by storing frequently accessed static content for quick access in subsequent requests. HTTP user output cache may increase performance of a web page by storing frequently accessed dynamic content of the web page in memory for quick access in subsequent requests. The HTTP user output cache may be based upon URLs. The dynamic content may be varied based upon contextual information within an HTTP header. HTTP user output cache may expose an API allowing for additional information to be provided to the HTTP user output cache.

Conflicts and inconsistencies may arise between URL rewriting and caching techniques (e.g., HTTP user cache and HTTP kernel cache). URL rewriting may be based upon a rule set that comprise conditions based on contextual information, such as HTTP server variables and HTTP headers. Because the caching techniques may not be aware of conditions within the rules, incorrect content for a particular HTTP request may be cached. For example, a URL rewriting module may apply a set of rules, with conditions based upon contextual information within HTTP server variables and/or HTTP headers, to an input URL. The input URL may be received comprising a first HTTP server variable that is derived from the input URL and a second HTTP server variable that is derived from a source other than the input URL (e.g., UserAgent server variable describing the web browser that made the HTTP request). An HTTP kernel cache may have access to information regarding the input URL but not the HTTP server variables, therefore the HTTP kernel cache may be able to understand the first HTTP server variable derived from the input URL, but not the second HTTP server variable derived from another source. The HTTP kernel cache may incorrectly store URL information regarding the input URL and/or rewritten URL because the HTTP kernel cache is unaware of the second HTTP server variable which may have been used in rewriting the input URL.

A current approach to solving cache inconsistencies with URL rewriting is to disable the HTTP kernel cache every time an input URL is rewritten, which minimizes the effectiveness of HTTP kernel cache. The HTTP kernel cache is disabled because there is a potential that the URL rewriting may comprise conditions derived from sources other than the input URL. The HTTP kernel cache is unaware on these conditions. Disabling kernel cache during every URL rewrite mitigates the chance that a cached URL is incorrectly returned to a user in response to a request for an internet resource. For example, a cached URL may be incorrectly returned when a user provides a similar input URL with different conditions than the cached URL was rewritten from, where the different conditions are derived from sources other than the input URL. This approach is ineffective because the HTTP kernel cache is disabled even though the URL rewriting may only comprise conditions derived from the input URL, which the HTTP kernel cache understands. The increased performance from HTTP kernel cache is lost because the HTTP kernel cache is disabled.

As provided herein, a URL may be rewritten while mitigating cache integrity issues. An HTTP user output cache may be configured to vary based upon conditions within a rule set used to rewrite an input URL. An HTTP kernel cache may be disabled if cache integrity would be not preserved based upon conditions used within the rule set used to rewrite the input URL. The input URL may comprise conditions within HTTP server variables and/or HTTP headers. If a condition is derived from the input URL and/or is a constant, then the condition is cache friendly. A condition is cache friendly because the HTTP kernel cache understands the input URL and therefore may be aware of the condition derived from the input URL. If the condition is not derived from the input URL (e.g., the condition is derived from a non-URL derived HTTP server variable), then the condition is cache unfriendly. A condition is cache unfriendly because the HTTP kernel cache in unaware of the condition because the condition may be derived from sources (e.g., web browser) unknown to the HTTP kernel cache.

If the input URL comprises cache friendly conditions and no cache unfriendly conditions, then the HTTP kernel cache and/or the HTTP user output cache are not disabled or varied because they may be able to understand the cache friendly conditions based upon the input URL. If an input URL comprises at least one cache unfriendly condition, then the HTTP kernel cache is disabled because the cache unfriendly conditions are not derived from the input URL. The HTTP user output cache may be varied based upon the unfriendly conditions. For example, upon determining the input URL comprises cache unfriendly conditions, the cache unfriendly conditions may be concatenated and encoded together with the input URL as a key. The HTTP user output cache may be varied based upon the information within the key to mitigate cache integrity issues.

Figure 1:
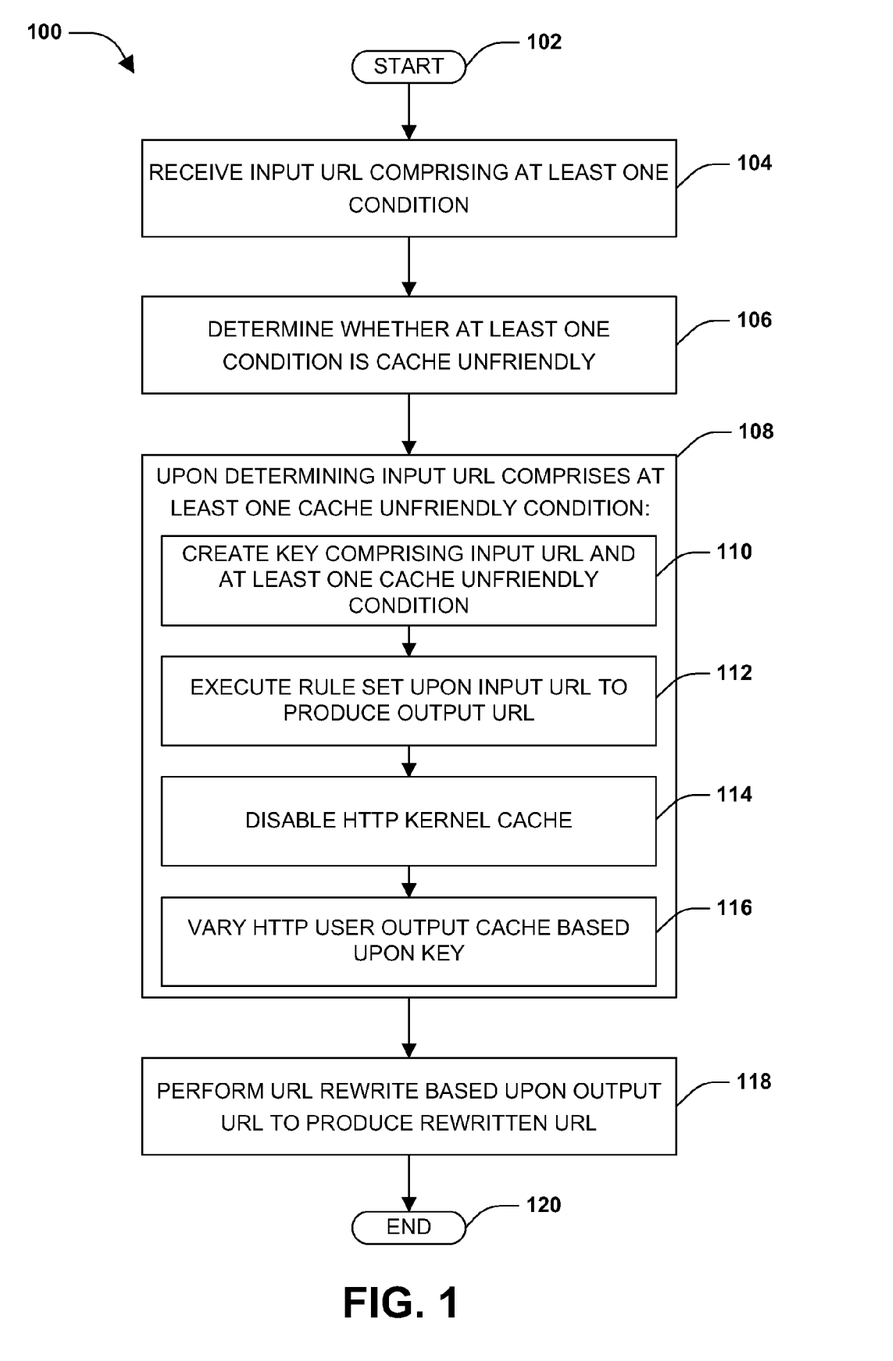
FIG. 1 is a flow chart illustrating an exemplary method of URL rewriting.

One embodiment of URL rewriting is illustrated by an exemplary method 100 in FIG. 1. At 102, the method begins. At 104, an input URL comprising at least one condition is received. The input URL may be received in an HTTP request from a web browser. The at least one condition may correspond to an HTTP server variable and/or an HTTP header used by a rule set to rewrite the input URL. At 106, a determination is made as to whether the at least one condition is cache unfriendly. For example, a condition may be cache unfriendly if the condition corresponds to context information derived from a source other than the input URL (e.g., the web browser). A cache friendly conditions list may comprise a list of HTTP server variables and/or HTTP headers that are URL-derived and/or constant. A condition may be determined cache unfriendly if the condition does not corresponding to an HTTP server variable and/or HTTP header within the cache friendly conditions list. In another example of determining a cache unfriendly condition, the rule set may be examined to determine whether the rule set references HTTP server variables and/or HTTP headers derived from sources other than the input URL.

At 108, upon determining the input URL comprises at least one cache unfriendly condition, a key comprising the input URL and at least one cache unfriendly condition may be created, at 110. For example, the values of the cache unfriendly conditions may be concatenated together and encoded with the input URL. The HTTP user output cache may vary by the concatenated values to ensure correctness. The concatenated values may also serve as a key used in an internal cache used for looking up frequently accessed rewritten URLs (e.g., cached rewritten URLs).

At 112, the rule set is executed upon the input URL to produce an output URL. Because at least one cache unfriendly condition was determined, the HTTP kernel cache is disabled, at 114. At 116, the HTTP user output cache is varied based upon the key. The HTTP user output cache may expose an API allowing additional information, such as the key, to be provided to the HTTP user output cache. The key may comprise information regarding the input URL and/or a concatenation of the cache unfriendly conditions. Because the HTTP user output cache is provided with the cache unfriendly conditions, the HTTP user output cache may vary caching to provide correct cache information. At 118, a URL rewrite is performed on the output URL to produce a rewritten URL. At 120, the method ends.

Figure 2:
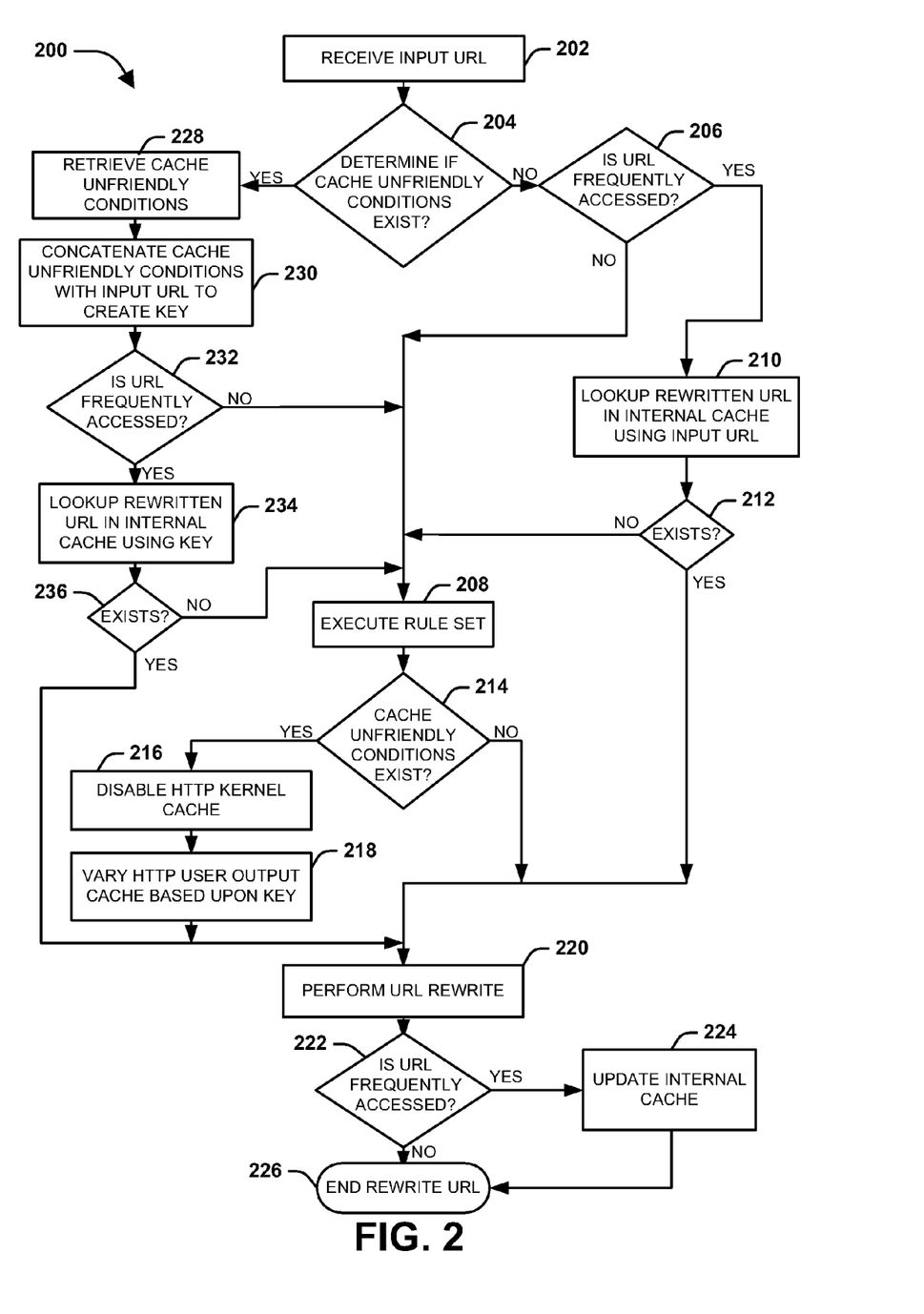
FIG. 2 is a flow chart illustrating an exemplary method of URL rewriting.

One embodiment of URL rewriting is illustrated by an exemplary flow diagram 200 in FIG. 2. At 202, an input URL is received. At 204, a determination is made as to whether a cache unfriendly condition exists. A cache unfriendly condition may exists based upon a rule set, that is to be applied to the input URL, referencing contextual information deriving from a source other than the input URL (e.g., an HTTP server variable deriving from a web browser and/or a user's operating environment).

At 204, if no cache unfriendly conditions exist (e.g., all conditions are derived from the input URL), then a determination is made as to whether the input URL is frequently accessed, at 206. If the input URL is frequently accessed, then the input URL is used to look up a cached rewritten URL, corresponding to the input URL, in an internal cache, at 210. The internal cache provides an optimization for quickly retrieving a cached rewritten URL (e.g., a rewritten URL corresponding to an input URL) without executing the rule set upon the input URL. At 212, a determination is made as to whether the cached rewritten URL exists within the internal cache. If the cached rewritten URL exists, then a URL rewrite may be performed at 220.

If the cached rewritten URL does not exist, then a rule set is executed upon the input URL to create an output URL, at 208. A determination is made as to whether cache unfriendly conditions exist, at 214. Because no cache unfriendly conditions exist, a URL rewrite is performed on the output URL to create a rewritten URL, at 220.

At 206, if the input URL is not frequently accessed, then a rule set is executed upon the input URL to create an output URL, at 208. Because no cache unfriendly conditions exist, a URL rewrite is performed on the output URL to create a rewritten URL, at 220.

At 204, if at least one cache unfriendly condition exists, then the cache unfriendly conditions are retrieved, at 228. At 230, the cache unfriendly conditions are concatenated with the input URL and may be encoded to create a key. At 232, a determination is made as to whether the input URL is frequently accessed. If the input URL is frequently accessed, then the input URL is used to look up a cached rewritten URL, corresponding to the input URL, in an internal cache using the key, at 234. At 236, a determination is made as to whether the cached rewritten URL exists within the internal cache. If the cached rewritten URL exists, then a URL rewrite may be performed at 220.

If the cached rewritten URL does not exist, then a rule set is executed upon the input URL to create an output URL, at 208. A determination is made as to whether cache unfriendly conditions exist, at 214. Because at least one cache unfriendly condition exists, the HTTP kernel cache is disabled, at 216. At 218, the HTTP user output cache is varied based upon the key. At 220, a URL rewrite is performed upon the output URL to create a rewritten URL.

At 232, if the input URL is not frequently accessed, then a rule set is executed upon the input URL to create an output URL, at 208. Because at least one cache unfriendly condition exists, the HTTP kernel cache is disabled, at 216. At 218, the HTTP user output cache is varied based upon the key. At 220, a URL rewrite is performed upon the output URL to create a rewritten URL.

Upon the performance of the URL rewrite to create a rewritten URL, at 220, a determination is made as to whether the rewritten URL is frequently accessed, at 222. If the rewritten URL is frequently accessed, then the internal cache is updated, at 224. The internal cache may comprise a cached rewritten URL corresponding to a rewritten URL of an input URL. The internal cache allows a cached rewritten URL to be retrieved in place of executing the rule set upon an input URL, thus mitigating processing involved with rewriting an input URL. Upon updating the internal cache, the URL rewrite ends, at 226. At 222, if the rewritten URL is not frequently accessed, then the URL rewrite ends, at 226.

Figure 3:
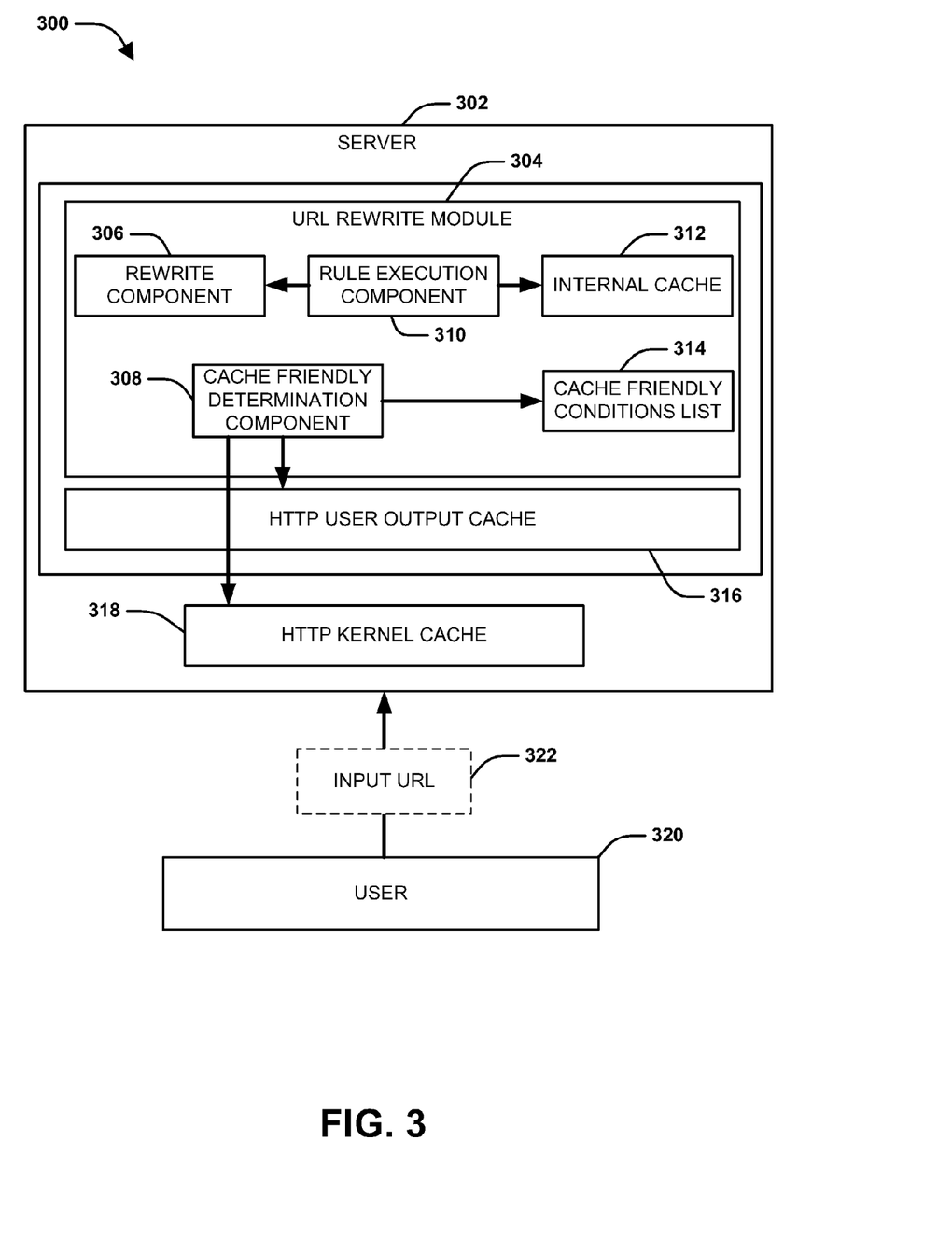
FIG. 3 is a component block diagram illustrating an exemplary system for URL rewriting.

FIG. 3 illustrates an example of a system 300 configured to rewrite a URL. The system 300 comprises a server 302. The server 302 may be configured to host web applications (e.g., a server configured with IIS). The server may comprise a URL rewrite module 304 and/or a HTTP kernel cache 318. The HTTP kernel cache may be configured to process input URLs and provide a response when the HTTP kernel cache is enabled. The server 302 may be configured to handle requests (e.g., an input URL 322) from a user (e.g., a user 320). The URL rewrite module 304 may be configured to receive an input URL 322, execute a rule set upon the input URL 322, create a rewritten URL, and/or perform other functionality related to a URL and/or cache. The URL rewrite module 304 may comprise a rewrite component 306, a cache friendly determination component 308, a rule execution component 310, an internal cache 312, and a cache friendly conditions list 314.

The cache friendly determination component 308 may be configured to determine whether at least one condition within the input URL 322 is cache friendly. For example, the cache friendly determination component 308 may examine a rule set that is to be applied to the input URL 322 to determine whether the rule set comprises references to conditions (e.g., HTTP server variables, HTTP headers, etc.) deriving from sources other than the input URL 322. The cache friendly determination component 308 may determine whether a condition is cache friendly by determining if the condition is listed within the cache friendly conditions list 314. The cache friendly conditions list 314 may comprise a set of URL-derived HTTP server variables and/or a set of constant HTTP server variables. If the condition matches a condition within the cache friendly conditions list 314, then the condition is determined to be a cache friendly condition. If the condition is not found within the cache friendly conditions list 314, then the condition is determined to be cache unfriendly.

If the cache friendly determination component 308 determines the input URL 322 comprises at least one cache unfriendly component, then a key is created comprising the input URL 322 and at least one cache unfriendly condition. The key may comprise the input URL 322 concatenated and encoded with at least one cache unfriendly condition. The cache friendly determination component 308 disables the HTTP kernel cache 318. The cache friendly determination component 308 sends the key to an HTTP user output cache 316, which is varied based upon the key. The HTTP user output cache 316 may expose an API that may be used to receive the key.

The rule execution component 310 may be configured to execute a rule set upon the input URL 322 to create an output URL. The output URL may be used by the rewrite component 306 to produce a rewritten URL based upon the output URL. The internal cache 312 may be configured to store cached rewritten URLs. The internal cache 312 may provide quick access to frequently rewritten URLs. For example if the frequency of access to a rewritten URL exceeds a predetermined threshold, then the rewritten URL may be stored as a cached rewritten URL. An input URL and/or a key may be used to look up a cached rewritten URL. The rule execution component 310 may bypass execution of the rule set upon the input URL 322 if the input URL corresponds to at least one cached rewritten URL. The rule execution component 310 may bypass executing the rule set upon the input URL 322 if the key corresponds to at least one cached rewritten URL.

The rewrite component 306 may be configured to execute a URL rewrite upon the output URL to produce a rewritten URL. The rewrite component may execute the URL rewrite based upon a non-matching pattern within the output URL.

Figure 4:
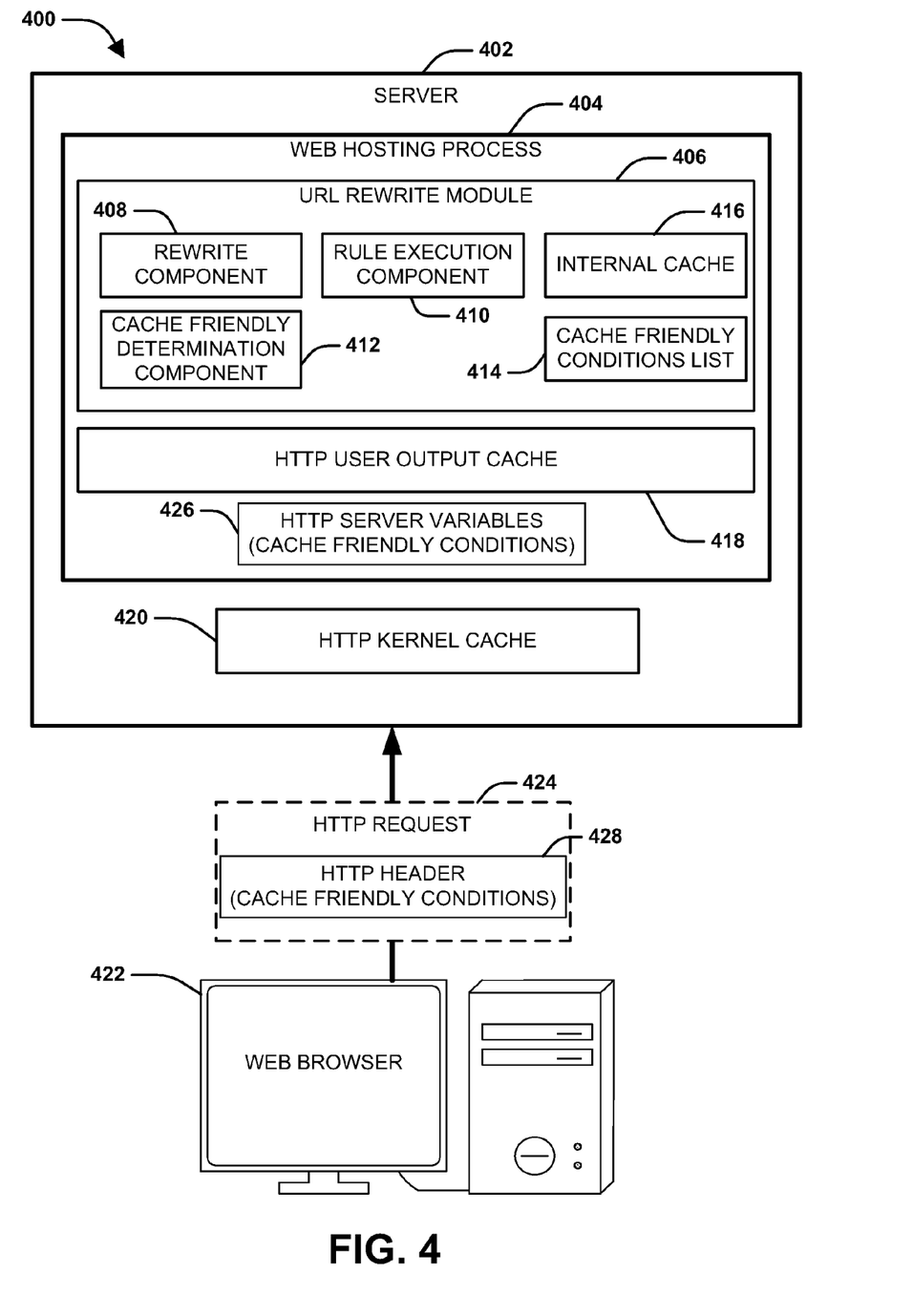
FIG. 4 is an illustration of an example of URL rewriting.

FIG. 4 illustrates an example 400 of rewriting a URL. A server 402 comprises a web hosting process 404 and a HTTP kernel cache 420. The web hosting process 404 may be configured to receive requests from a user. For example, the web hosting process 404 may receive an HTTP request 424 comprising an HTTP header 426 from a web browser 422. The web hosting process 404 may be configured to process the HTTP request and return HTTP data to the user (e.g., HTTP data corresponding to a webpage).

The web hosting process 404 comprises a URL rewrite module 406, which may be configured to assist in processing an input URL. The web hosting process 404 comprises an HTTP user output cache 418, which may be configured to cache information frequently requested by users (e.g., if a dataset is frequently requested, then the dataset may be stored in the HTTP user output cache for quick access instead of being retrieved from a database comprising the dataset for every subsequent request). The web hosting process 404 may resolve HTTP server variables 428 corresponding to the HTTP request 424.

The URL rewrite module 406 comprises a rewrite component 408, a rule execution component 410, a cache friendly determination component 412, a cache friendly conditions list 414, and an internal cache 416. In example 400, the HTTP request 424 is received from the web browser 422. The HTTP request 424 may comprise the HTTP header 426 and an input URL (e.g., a URL to a webpage a user wants displayed through the web browser 422). Upon a determination the input URL is to be rewritten (e.g., the input URL matches at least one rule within a rule set), the cache friendly determination component 412 determines whether at least one condition within the input URL is cache unfriendly. For example, the cache friendly determination component 412 may determine whether the rule set, that is to be applied to the input URL, comprises references to conditions within the input URL that derive from sources other than the input URL. The conditions may be contextual information within the HTTP header 426 and/or the HTTP server variables 428. If a condition derives from a source other than the input URL, then the cache friendly determination component 412 determines the condition is a cache unfriendly condition. In another example, the cache friendly determination component 412 may determine a condition is a cache unfriendly condition if the condition does not correspond to at least one condition within the cache friendly conditions list 414.

In example 400, the cache friendly determination component 412 determines there are no cache unfriendly conditions and that the HTTP header 426 and the HTTP server variables 428 are cache friendly conditions (e.g., the HTTP header 426 and the HTTP server variables 428 matched conditions within the cache friendly conditions list 414, derive from the input URL, and/or are constants). Upon determining no cache unfriendly conditions exist, the rule execution component 410 may make a determination as to whether the input URL corresponds to a cached rewritten URL within the internal cache 416. If a corresponding cached rewritten URL is not within the internal cache 416, then the rule execution component 410 executes the rule set upon the input URL to produce an output URL. The rewrite component 408 performs a URL rewrite upon the output URL to produce a rewritten URL. If the rewritten URL is frequently accessed, then it may be stored within the internal cache 416. The internal cache 416 mitigates the execution of the rule set by the rule execution component 410 to improve overall performance in URL rewriting.

Figure 5:
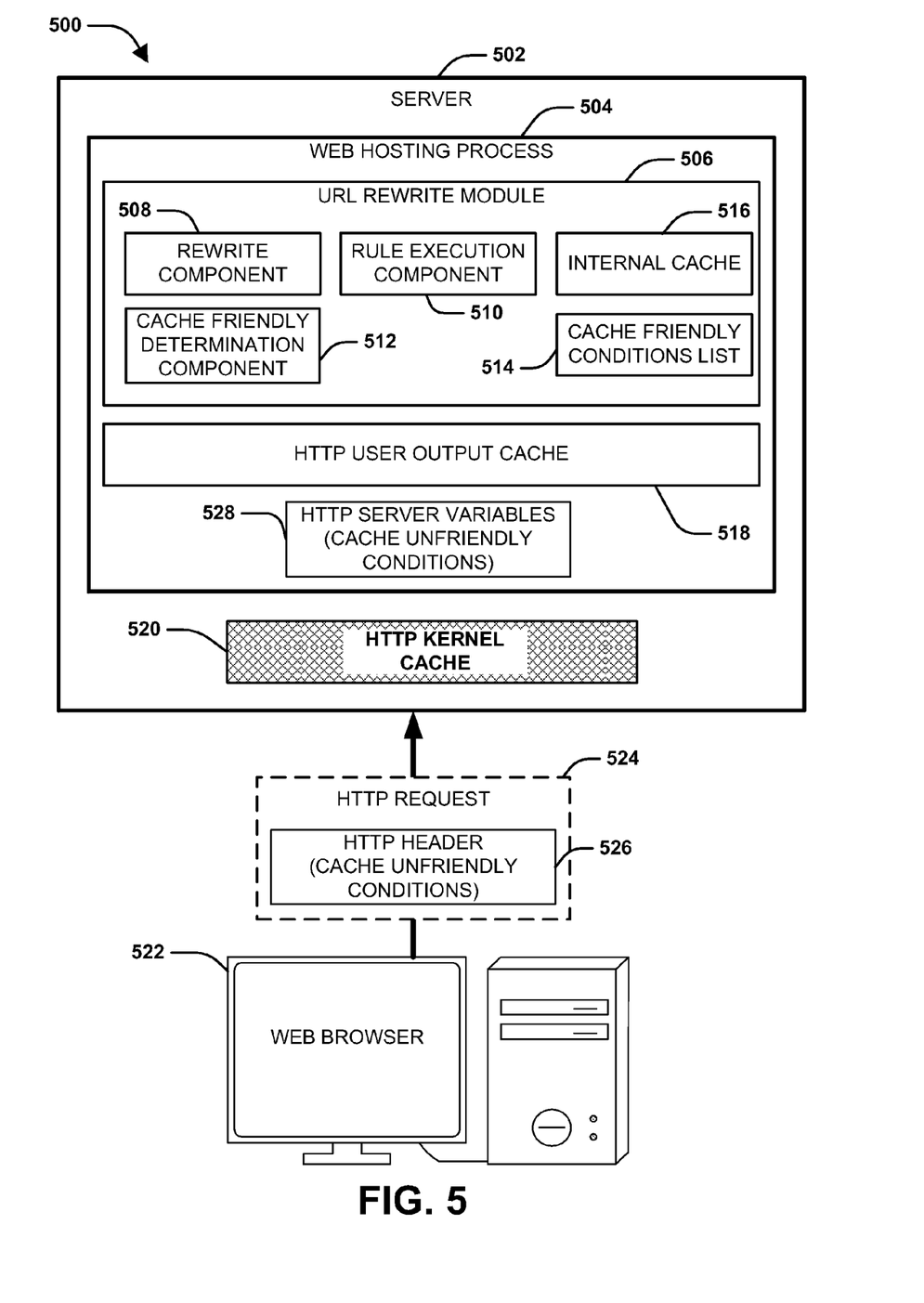
FIG. 5 is an illustration of an example of URL rewriting.

FIG. 5 illustrates an example 500 of rewriting a URL. A server 502 comprises a web hosting process 504 and a HTTP kernel cache 520. The web hosting process 504 may be configured to receive requests from a user. For example, the web hosting process 504 may receive an HTTP request 524 comprising an HTTP header 526 from a web browser 522. The web hosting process 504 may be configured to process the HTTP request 524 and return HTTP data to the user.

The web hosting process 504 comprises a URL rewrite module 506, which may be configured to assist in processing an input URL. The web hosting process 504 comprises an HTTP user output cache 518, which may be configured to cache information frequently requested by users in order to mitigate processing time. The web hosting process 504 may resolve HTTP server variables 528 corresponding to the HTTP request 524.

The URL rewrite module 506 comprises a rewrite component 508, a rule execution component 510, a cache friendly determination component 512, a cache friendly conditions list 514, and an internal cache 516. In example 500, the HTTP request 524 is received from the web browser 522. The HTTP request 524 may comprise the HTTP header 526 and an input URL. Upon a determination the input URL is to be rewritten, the cache friendly determination component 512 determines whether at least one condition within the input URL is cache unfriendly. The cache friendly determination component 512 may determine a condition is cache unfriendly if the condition derives from a source other than the input URL and/or the condition does not corresponding to at least one condition within the cache friendly conditions list 514.

In example 500, the cache friendly determination component 512 determines at least one cache unfriendly condition exists. Because at least one cache unfriendly condition exists, the cache friendly determination component 512 may create a key comprising the input URL concatenated and encoded with at least one cache unfriendly condition. The cache friendly determination component 512 may disable the HTTP kernel cache 520 because the HTTP kernel cache 520 is unaware of the cache unfriendly conditions (e.g., the HTTP kernel cache 520 may only be aware of conditions derived from the input URL) and may cache incorrect information. The cache friendly determination component 512 may vary the HTTP user output cache 518 based upon the key, thus allowing the HTTP user output cache 518 to cache consistent data corresponding to the input URL, the cache unfriendly conditions, and/or cache friendly conditions.

The rule execution component 510 may execute a rule set upon the input URL to create an output URL. The rule execution component 510 may bypass executing the rule set if a cached rewritten URL, corresponding to the input URL, exists within the internal cache 516. The rewrite component 508 performs a URL rewrite upon the output URL to create a rewritten URL, which may be stored within the internal cache 516 if the URL is frequently accessed.

Figure 6:
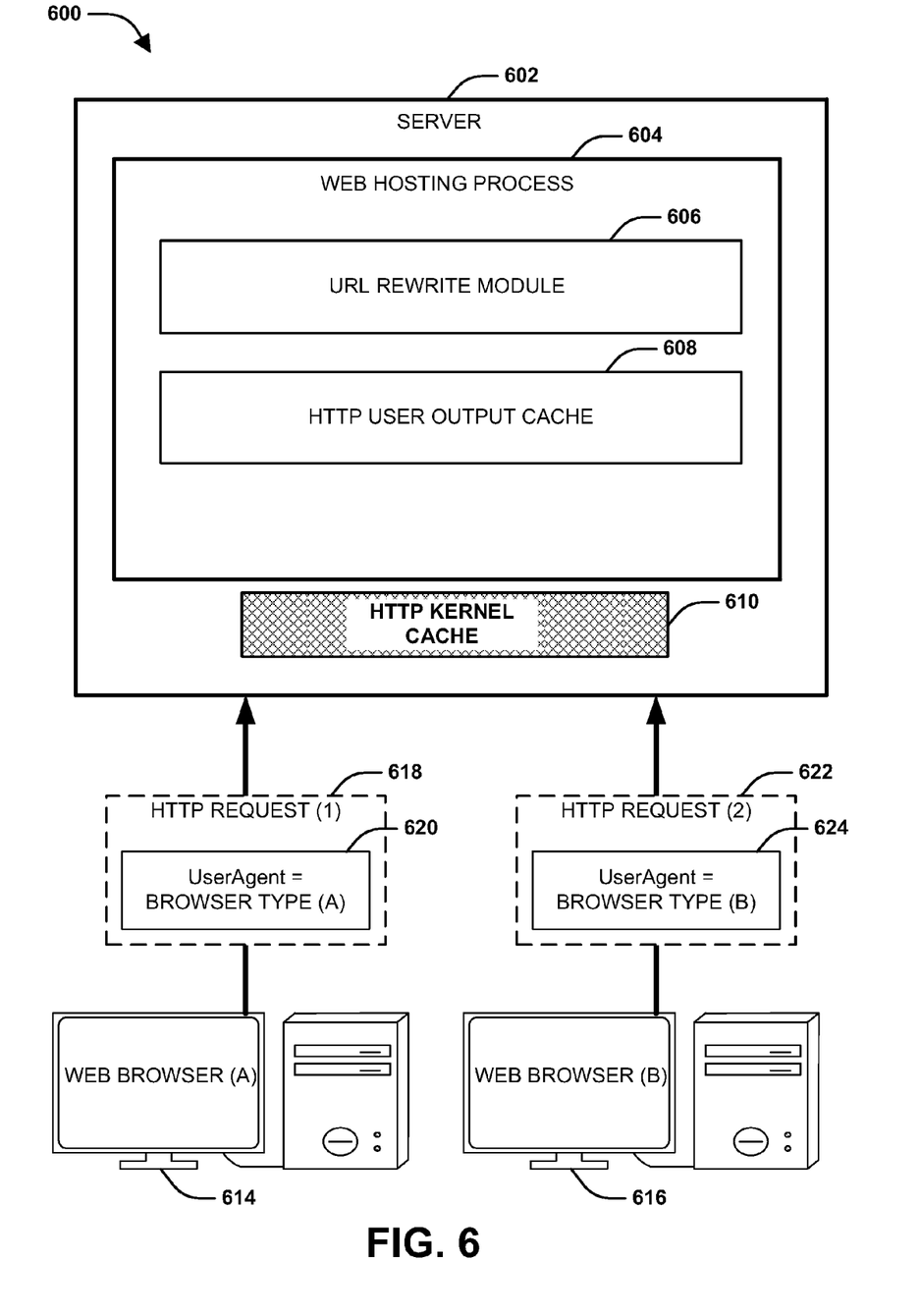
FIG. 6 is an illustration of an example of rewriting a URL to prevent an incorrect response to an HTTP request.

FIG. 6 illustrates an example 600 of rewriting a URL to prevent an incorrect response to an HTTP request. A server 602 comprises a web hosting process 604 and a HTTP kernel cache 610. The web hosting process 604 comprises a URL rewrite module 606 and an HTTP user output cache 608. An HTTP server variable (1) 620 corresponding to an HTTP request (1) 618 may be resolved by the web hosting process 604. The HTTP server variable (1) 620 is determined to be a cache unfriendly condition because UserAgent is a condition derived from the type of web browser that sent the HTTP request (1) 618 and is not derived from an input URL. Because the HTTP server variable (1) 620 is cache unfriendly, the HTTP kernel cache 610 is disabled and the HTTP user output cache 608 is varied based upon a key comprising a concatenation and encoding of the input URL and the HTTP server variable (1) 620.

The HTTP kernel cache 610 is disabled because the HTTP kernel cache 610 may cache incorrect URL and/or web application data (e.g., a dataset, HTTP corresponding to a web page, etc.) without correctly understanding the cache unfriendly HTTP server variable (1) 620. For example, if web browser (B) 616 provides a similar input URL within an HTTP request (2) 622, then the HTTP kernel cache 610 may respond with the same data that was returned to web browser (A) 614. An inconsistency arises when the HTTP kernel cache 610 returns similar data to web browser (A) 614 and web browser (b) 616, when in actuality the data may be different because of the different HTTP server variables that the HTTP kernel cache 610 could not take into account. The HTTP kernel cache 610 is unaware of the HTTP server variables (e.g., an HTTP server variable 624) and is unable to distinguish a variance that may exists in a response to a similar input URL having different cache unfriendly conditions.

The increased performance from the HTTP kernel cache 610 is harnessed because a determination is made as to whether cache unfriendly conditions exist. If no cache unfriendly conditions exist, then the HTTP kernel cache 610 may not be disabled and is operable to cache URL and/or web application data. Similarly, the increased performance from the HTTP user output cache 608 is harnessed because the HTTP user output cache 608 is not disabled, but is varied based upon cache unfriendly conditions.

Figure 7:
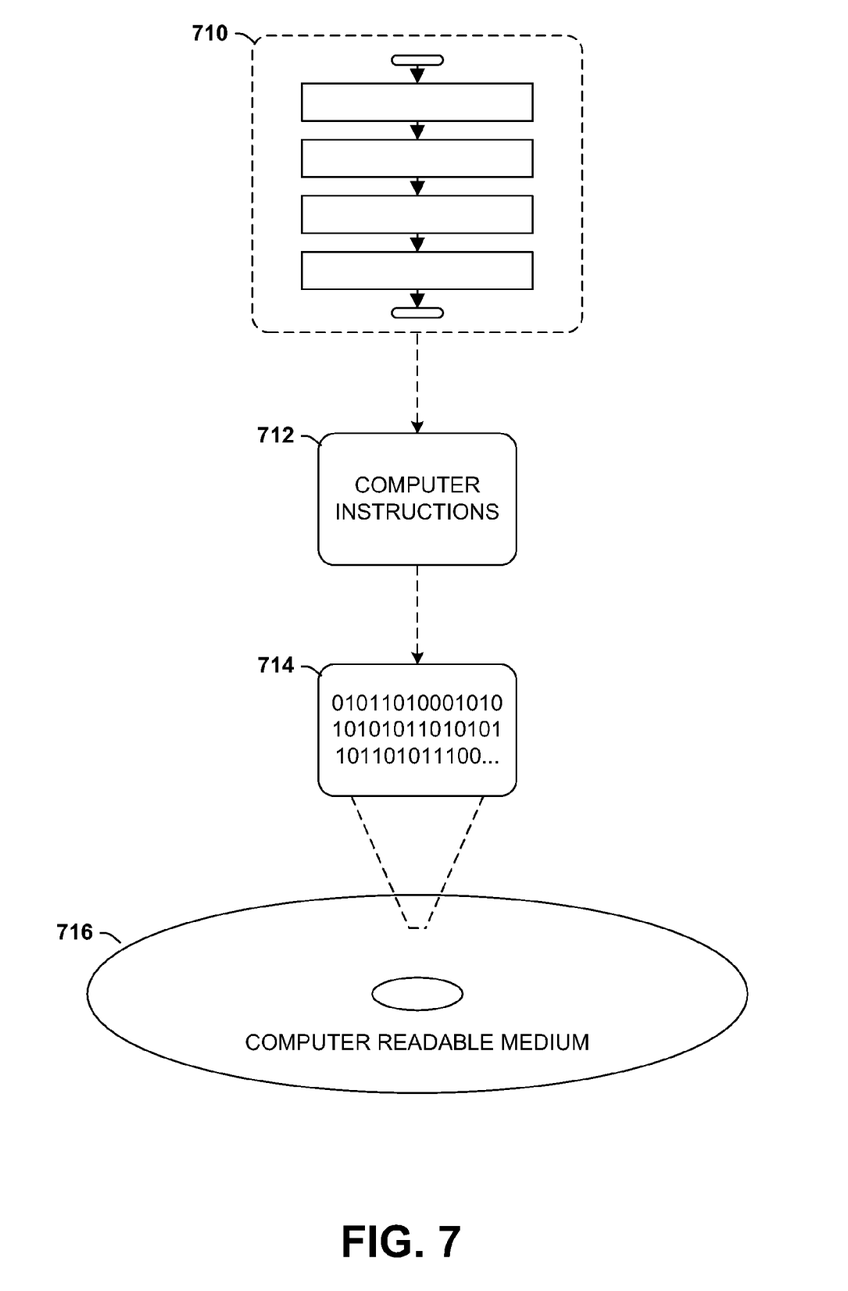
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 710. This computer-readable data 710 in turn comprises a set of computer instructions 712 configured to operate according to one or more of the principles set forth herein. In one such embodiment 700, the processor-executable instructions 714 may be configured to perform a method, such as the exemplary method 100 of FIG. 1, for example. In another such embodiment, the processor-executable instructions 714 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
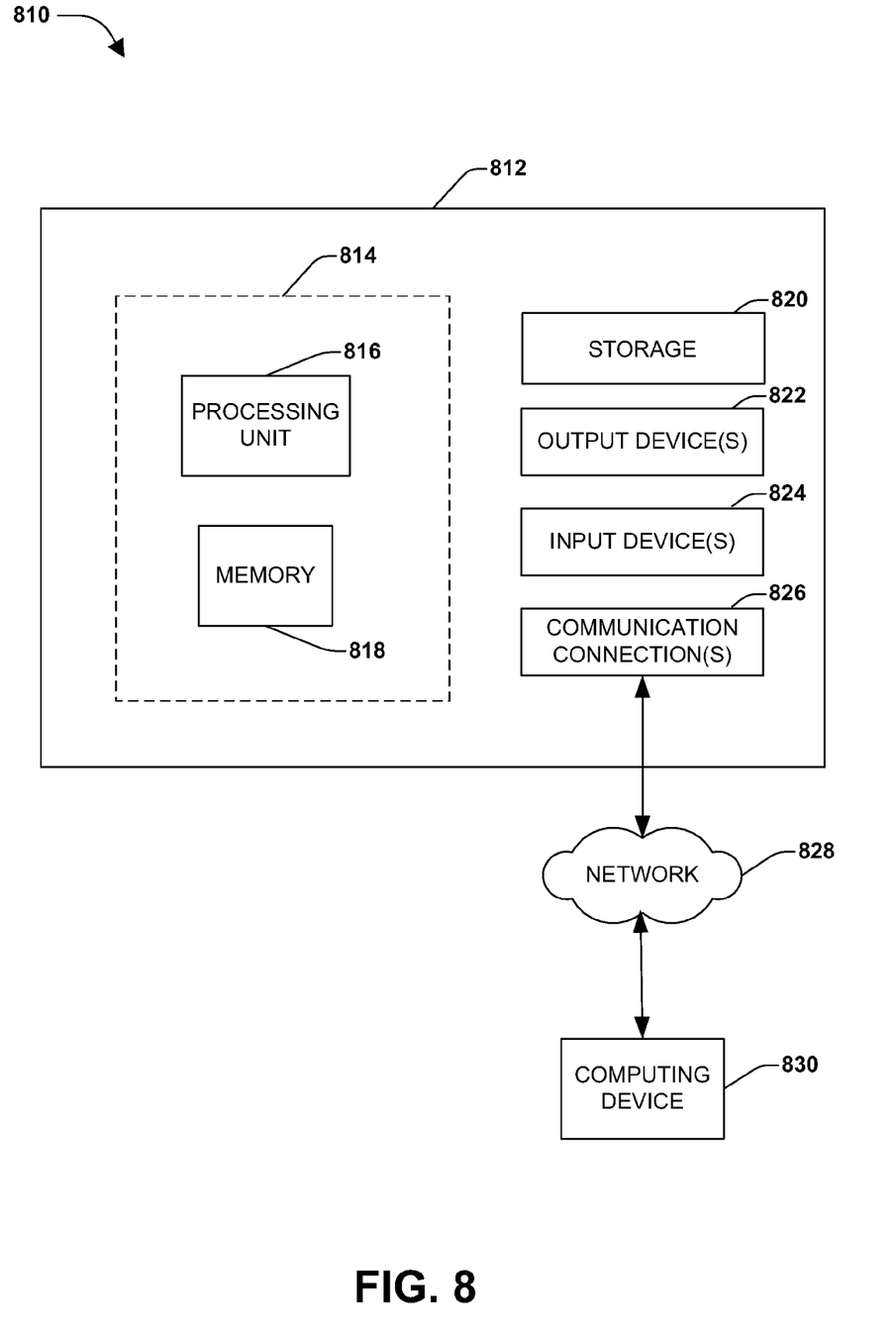
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for URL rewriting comprising:
   receiving an input URL comprising at least one condition;
   determining whether at least one condition is cache unfriendly;
   if the input URL comprises at least one cache unfriendly condition, then:
      creating a key comprising the input URL and the at least one cache unfriendly condition;
      executing a rule set upon the input URL to produce an output URL;
      disabling an HTTP kernel cache; and
      varying an HTTP user output cache based upon the key;
   if the input URL does not comprise at least one cache unfriendly condition, then:
      executing the rule set upon the input URL to produce the output URL; and
      bypassing the disabling of the HTTP kernel cache; and
   performing a URL rewrite based upon the output URL to produce a rewritten URL, the determining implemented via a processing unit.

2. The method of claim 1, the determining whether the at least one condition is cache unfriendly comprising:
   determining a cache unfriendly condition based upon a condition being an HTTP server variable deriving from web browser information.

3. The method of claim 1, the creating a key comprising:
   concatenating the input URL with the at least one cache unfriendly condition.

4. The method of claim 1, comprising:
   updating an internal cache if a rewritten URL access frequency exceeds a pre-determined threshold.

5. The method of claim 1, comprising:
if the input URL does not comprise at least one cache unfriendly condition and the input URL is accessed above a pre-determined threshold:
determining if a cached rewritten URL corresponding to the input URL exists within an internal cache; and
upon determining the cached rewritten URL exists within the internal cache, performing a URL rewrite upon the cached rewritten URL.

6. The method of claim 5, comprising:
upon determining the cached rewritten URL does not exist within the internal cache:
executing the rule set upon the input URL to produce the output URL; and
performing the URL rewrite based upon the output URL to produce the rewritten URL.

7. The method of claim 1, comprising:
if the input URL comprises at least one cache unfriendly condition and the input URL is accessed above a pre-determined threshold:
determining if a cached rewritten URL corresponding to the key exists within an internal cache; and
upon determining the cached rewritten URL exists within the internal cache, performing a URL rewrite upon the cached rewritten URL.

8. The method of claim 7, comprising:
upon determining the cached rewritten URL does not exist within the internal cache:
executing the rule set upon the input URL to produce the output URL;
disabling the HTTP kernel cache;
varying the HTTP user output cache based upon the key; and
performing the URL rewrite based upon the output URL to produce the rewritten URL.

9. The method of claim 1, the determining whether the at least one condition is cache unfriendly comprising:
determining a cache friendly condition based upon at least one of:
a condition being input URL derived, and
the condition being a constant; and
determining a cache unfriendly condition based upon the condition being non-input URL derived.

10. The method of claim 1, the at least one condition comprising at least one of:
a URL-derived HTTP server variable;
a non-URL derived HTTP server variable;
a constant HTTP server variable; and
an HTTP header.

11. A system for rewriting a URL comprising:
a processing unit; and
a URL rewrite module comprising:
a cache friendly determination component configured to:
determine whether at least one condition within an input URL is cache friendly;
if the input URL comprises at least one cache unfriendly condition, then:
create a key comprising the input URL and the at least one cache unfriendly condition;
disable an HTTP kernel cache; and
vary an HTTP user output cache based upon the key; and
bypass the disabling of the HTTP kernel if the input URL does not comprise at least one cache unfriendly condition;
a rule execution component configured to execute a rule set upon the input URL to create an output URL; and
a rewrite component configured to execute a URL rewrite upon the output URL to produce a rewritten URL.

12. The system of claim 11, the URL rewrite module comprising:
an internal cache configured to store at least one cached rewritten URL.

13. The system of claim 12, the internal cache configured to store the at least one cached rewritten URL based upon a rewritten URL access frequency exceeding a pre-determined threshold.

14. The system of claim 13, the rule execution component configured to bypass the execution of the rule set based upon at least one of:
the input URL corresponding to at least one cached rewritten URL; and
the key corresponding to at least one cached rewritten URL.

15. The system of claim 11, the URL rewrite module comprising:
a cache friendly condition list comprising at least one of:
a set of URL-derived HTTP server variables; and
a set of constant HTTP server variables.

16. The system of claim 15, the cache friendly determination component configured to determine at least one cache friendly condition based upon a condition corresponding to a cache friendly condition within the cache friendly condition list.

17. The system of claim 11, the HTTP user output cache comprising an exposed API configured to receive the key from the cache friendly determination component.

18. The system of claim 11, the rewrite component configured to rewrite the output URL based upon a non-matching pattern.

19. The system of claim 11, the HTTP kernel cache configured to process the input URL and provide a response when the HTTP kernel cache is enabled.

20. A computer readable storage medium comprising computer executable instructions that when executed via a processing unit perform a method for rewriting a URL comprising:
receiving an input URL comprising at least one condition;
determining whether at least one condition is cache unfriendly;
if the input URL comprises at least one cache unfriendly condition, then:
creating a key comprising the input URL and the at least one cache unfriendly condition;
executing a rule set upon the input URL to produce an output URL;
disabling an HTTP kernel cache; and
varying an HTTP user output cache based upon the key;
if the input URL does not comprise at least one cache unfriendly condition then:
executing the rule set upon the input URL to produce the output URL; and
bypassing the disabling of the HTTP kernel cache; and
performing a URL rewrite based upon the output URL to produce a rewritten URL.

* * * * *